United States Patent [19]  [11] 4,014,243
Toomingas  [45] Mar. 29, 1977

[54] EXPANDING BOLT
[75] Inventor: Illar Toomingas, Enskede, Sweden
[73] Assignee: Telefonaktiebolaget L M Ericsson, Stockholm, Sweden
[22] Filed: Nov. 28, 1975
[21] Appl. No.: 635,927
[30] Foreign Application Priority Data
  Dec. 11, 1974 Sweden .......................... 7415535
[52] U.S. Cl. .................................. 85/74; 85/85; 85/79
[51] Int. Cl.² .......................................... F16B 13/04
[58] Field of Search .............. 85/67, 73, 74, 75, 76, 85/77, 78, 79, 83, 85, 86, 87, 88

[56] References Cited
UNITED STATES PATENTS

| | | | |
|---|---|---|---|
| 2,316,918 | 4/1943 | Wallace | 85/83 X |
| 2,661,649 | 12/1953 | Skinner | 85/75 |
| 3,277,770 | 10/1966 | McCulloch | 85/87 X |
| 3,448,651 | 6/1969 | Passer | 85/77 X |
| 3,512,448 | 5/1970 | Summerlin et al. | 85/75 |
| 3,546,998 | 12/1970 | Lerich | 85/87 X |
| 3,703,119 | 11/1972 | Lerich | 85/87 X |
| 3,709,089 | 1/1973 | Seetaram | 85/85 X |
| 3,750,526 | 8/1973 | Lerich | 85/85 X |
| 3,766,819 | 10/1973 | Giannuzzi | 85/88 X |
| 3,922,947 | 12/1975 | Leonardo et al. | 85/77 |

FOREIGN PATENTS OR APPLICATIONS

| | | | |
|---|---|---|---|
| 1,379,461 | 10/1964 | France | 85/73 |
| 2,300,365 | 7/1974 | Germany | |
| 1,954,077 | 5/1970 | Germany | 85/77 |
| 109,439 | 7/1966 | Norway | |
| 361,073 | 10/1973 | Sweden | |
| 254,174 | 4/1948 | Switzerland | 85/73 |
| 576,813 | 4/1946 | United Kingdom | 85/77 |

Primary Examiner—Roy D. Frazier
Assistant Examiner—Thomas J. Holko
Attorney, Agent, or Firm—Hane, Sullivan & Spiecens

[57] ABSTRACT

An expanding bolt for attachment to the walls of a cavity, which bolt is threaded at its outer end for cooperation with a nut, and at its inner end is formed to a cone. The cone is surrounded by an expanding sleeve, one edge of which is continuous and oval and the other edge of which is split into a number of pointed tips, some of which are longer than the others.

2 Claims, 3 Drawing Figures

EXPANDING BOLT

SUMMARY OF THE INVENTION

Known expanding bolts consist of a sleeve around the shank of the cone-shaped part for expansion of the sleeve against the walls of a cavity in which the bolt is inserted. The holding force on the sleeve and thereby on the whole expanding bolt depends on the degree of piercing of the sleeve in the walls of the cavity. In order that the cone shall be able to expand the sleeve, the sleeve has to grip the walls of the cavity with at least some force just before the cone begins to be drawn outwards through the sleeve. The sleeve thereby scratches against the walls of the cavity at the moment when the bolt is put into the cavity, which causes difficulty in inserting the bolt into the cavity. When inserting, it may happen that material is rubbed from the sleeve that covers the shank of the expanding bolt, and thereby increases its diameter which causes the expansion bolt to join and thereby present the insertion of the bolt into the cavity to an intended depth. A characteristic of the expanding bolt according to the invention is that the edge of the sleeve has notches which leave space for the rubbed material, and further that the form of the sleeve diverges from the circular so that parts of it which, besides that show the notches, engage with the walls of the cavity when the expansion bolt is inserted and when the cone of the expansion bolt begins to be drawn out.

When the cone of the expanding bolt has a small cone angle, that is the angle between the mantle of the cone and its axis, a great force appears for expansion of the sleeve when the cone is drawn into the sleeve even for a moderate pulling force on the shank of the expanding bolt. Hitherto, it has been common that the cone angle be slightly less than or slightly over 10°.

The condition that a great force for expansion of the sleeve of the expanding bolt be easily obtained with a small cone angle also entails that the risk is great for the material, in which the cavity is drilled, to be broken by the force which acts on the walls of the cavity. The risk of breaking is obviously greater for porous, low strength wall materials than with hard wall materials with high strength. Even if the expansion force is not always capable of breaking the wall, it happens with porous wall material that the expanding sleeve is pressed into the wall of the cavity so that the bolt, by the pulling force, is drawn out through the sleeve and out of the cavity.

The cone angle of the cone of the expanding bolt has, for the reasons which have been stated, to be chosen as a comprise between the demand on the sleeve of the bolt to be expanded by a moderate pulling force and the demand that the risk for breaking the wall material be insignificant. The cone angle is correctly chosen when, with increasing pulling force, the sleeve manages to hold the bolt and finally bursts at a force which is near the breaking strength of the threaded part of the bolt shank. It is a characteristic of the present invention that the cone angle be essentially larger than is the case of expanding bolts hitherto known.

In order that not too high a pulling force be required for the expansion of the sleeve of the expansion bolt in spite of the large cone angle, the part of the sleeve directed towards the cone is, according to the invention slit into a number of tips which may be pointed and of different lengths.

BRIEF DESCRIPTIONS OF THE DRAWINGS

In the following, an example of an expanding bolt according to the invention is described, with reference to the accompanying drawing, where FIG. 1 shows a bolt together with the expanding sleeve, FIG. 2 shows a cross-section through the bolt and also a part of the sleeve in an end view, and FIG. 3 shows a plan view of the expanding sleeve.

DETAILED DESCRIPTION OF THE INVENTION

Figure 1:
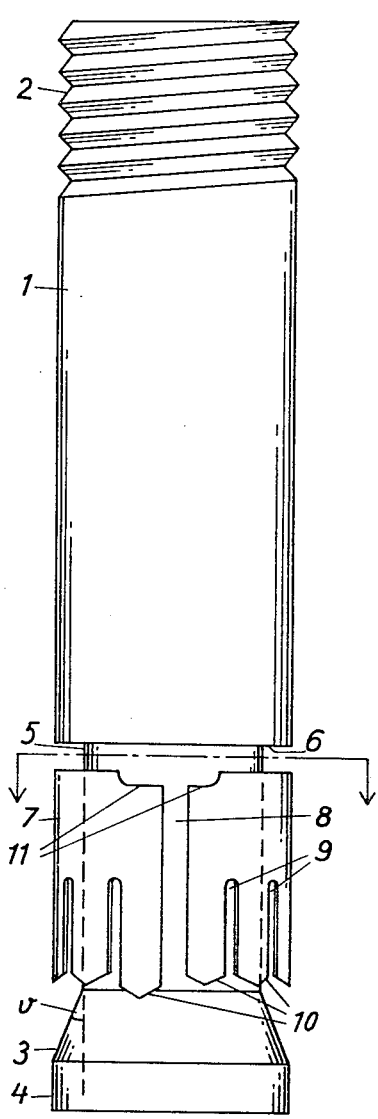

The bolt 1 in FIG. 1 is, at its outer end 2 threaded in order to cooperate with a nut (not shown) and is, at its inner end, formed to a cone 3. The cone is coaxial with the bolt and has its narrowest part directed towards the outer end of the bolt. The widest part of the cone is finished with a short cylindrical part 4 provided with a sharp edge for scraping away loose material during the insertion of the bolt into the cavity. Between the cone 3 and the bolt there is a cylindrical transition part 5, the diameter of which is less than that of the bolt. Between the transition part 5 and the surface of the bolt a radially directed projection 6 is thereby formed.

The cylindrical transition part 5 of the bolt is surrounded by a sleeve 7 of a uniformly thick material. The sleeve is made with an axial split 8 which runs the whole length of the sleeve. As appears from FIG. 3, the sleeve is further provided with a number of notches 9 in the edge which is directed towards the inner part of the bolt. The sleeve 7 is divided by the notches into tips 10 which may be bent outwards against the wall of the cavity when inserting the cone 3 in the sleeve 7.

What is described about the expanding bolt up till now is in principle known, for example from the Swedish Pat. No. 361.073.

Figure 2:
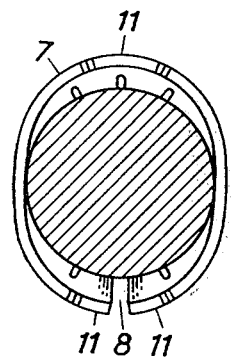

In the expanding bolt according to the invention which is shown in FIG. 2, the expanding sleeve 7 is constructed so that, along one part of is length, parts of the circumference are situated a larger distance from the centre of the sleeve than the main part of the circumference of the sleeve which is pressed against the cylindrical transition part 5. In the example shown, the sleeve has an oval form so that in two diametrically opposite points it bears against the cylindrial transition part 5, and in two other points reaches far away from the transition part to a diameter which is somewhat larger than the diameter of the shank of the expanding bolt. Other forms of the sleeve are possible where more than two parts of the sleeve extend outside the diameter of the expanding bolt.

In the expanded parts of the sleeve 7, notches 11 are made in the edge directed towards the outer end of the bolt. The notches pick up material which, at the insertion of the expanding bolt into the cavity, may be rubbed off from the sleeve, and which otherwise may be laid on the shank 1 of the expanding bolt and thereby hamper the insertion of the bolt into the cavity.

Figure 3:
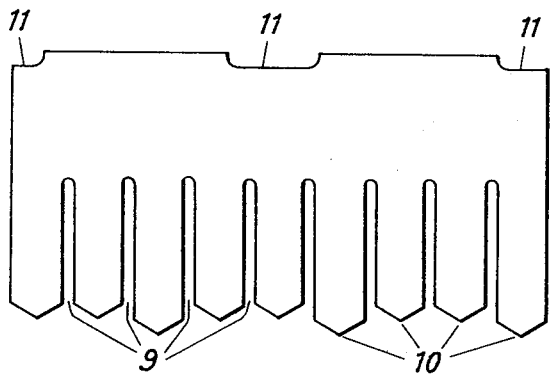

As appears from FIG. 1 and FIG. 3, the edge of the expanding sleeve 7 directed towards the inner part of the bolt is by the notches 9, divided into a number of tips 10. Some of the tips are longer than the others, which implies that only a low pulling force on the bolt is required for the longer tips to be bent against the wall of the cavity and to catch hold of it. In order that the piercing of the tips in the wall of the cavity shall be further facilitated, the tips, in the example shown are made with pointed ends.

The cone 3 of the expanding bolt has a cone angle $v$ which in the example is 22.5°. A suitable compromise between the demand for the expanding sleeve to expanded into engagement with the wall of the cavity for a low pulling force and the demand for the sleeve not to break the cavity has been found to lie within the range of 17.5° to 30.0° and it is particularly advantageous have a cone angle within the range 22° to 25°.

We claim:

1. An expanding bolt for attachment to the walls of a cavity, comprising: a shank portion having a threaded outer end for the receiption thereabout of a nut for tightening; an inner end formed as a cone coaxial with said outer end, said cone having a narrow part directed toward said outer end; a cylindrical transition portion between said cone and said shank portion having a diameter less than said shank portion; and an expanding sleeve surrounding said cylindrical transition portion, said expanding sleeve having an axial slit formed along the length thereof for facilitating the expansion thereof, a continuous edge directed toward said outer end of said shank portion, a plurality of slots formed about the circumference of said expanding sleeve, each slot extending from the edge directed toward said inner end toward said continuous edge directed toward said outer end, and a plurality of straight tips formed between said plurality of slots, some of said plurality of straight tips having a length longer than other ones of said plurality of straight tips, each of said plurality of straight tips having a pointed end for easy penetration of said expanding sleeve into the walls of said cavity; said expanding sleve having a circumferential shape such that parts thereof extend beyond the circumference of said shank portion as measured in a plane taken perpendicular to the length of said shank portion, so that said parts thereof contact the walls of said cavity upon insertion of said bolt into said cavity to thereby afford initial holding of the expanding sleeve therein, said edge of said circumference of said expanding sleeve directed toward said outer end comprising a plurality of notches extending partly along the length of said expanding sleeve toward said inner end so that material rubbed off from said expanding sleeve as said expanding sleeve enters into said cavity falls into the area defined between said expanding sleeve and said cylindrical transition portion to thereby prevent any obstruction of said shank portion of said bolt from entering into said cavity, whereby said straight tips of said expanding sleeve are caused to engage the walls of said cavity by pulling on said outer end of said shank portion which thereby causes said cone to enter into said sleeve and expand outwardly said plurality of straight tips.

2. The expanding bolt according to claim 1, wherein said circumferential shape of said expanding sleeve is oval, and said cone has at least a portion thereof that is of greater diameter than the minor diameter of said oval-shaped expanding sleeve, and at least a portion thereof that is of greater diameter than the major diameter of said oval-shaped expanding sleeve.

* * * * *